(12) United States Patent
Klingbeil et al.

(10) Patent No.: US 9,631,569 B2
(45) Date of Patent: Apr. 25, 2017

(54) SYSTEM AND METHOD FOR CONTROLLING OPERATION OF AN ENGINE

(71) Applicant: General Electric Company, Schenectady, NY (US)

(72) Inventors: Adam Edgar Klingbeil, Ballston Lake, NY (US); Jennifer Lynn Jackson, Troy, NY (US); James Robert Mischler, Girard, PA (US); Kevin Michael Fisher, North East, PA (US)

(73) Assignee: General Electric Company, Niskayuna, NY (US)

( * ) Notice: Subject to any disclaimer, the term of this patent is extended or adjusted under 35 U.S.C. 154(b) by 281 days.

(21) Appl. No.: 14/450,493

(22) Filed: Aug. 4, 2014

(65) Prior Publication Data
US 2016/0032859 A1 Feb. 4, 2016

(51) Int. Cl.
*F02D 41/00* (2006.01)
*F02D 19/06* (2006.01)
(Continued)

(52) U.S. Cl.
CPC ............ *F02D 41/26* (2013.01); *F02D 17/02* (2013.01); *F02D 19/061* (2013.01);
(Continued)

(58) Field of Classification Search
CPC .. F02D 41/26; F02D 41/0025; F02D 41/0087; F02D 41/3094; F02D 41/30;
(Continued)

(56) References Cited

U.S. PATENT DOCUMENTS 4,143,635 A 3/1979 Iizuka et al.
4,179,892 A 12/1979 Heydrich
(Continued)

FOREIGN PATENT DOCUMENTS

CA 2798599 A1 2/2013
CN 1536215 A 10/2004
(Continued)

OTHER PUBLICATIONS

Zhi-Qiang et al. "A Study of Optimization of the Air/Fuel Ratio and It's Effect on Exhaust Emissions of a CNG Port Injection QHCCI Engine", Journal of Engineering Thermophysics, CNKI journal, vol. 22 Suppl., Jun. 2001, 4 Pages.
(Continued)

*Primary Examiner* — Thomas Moulis
*Assistant Examiner* — George Jin
(74) *Attorney, Agent, or Firm* — Joseph J. Christian (57) ABSTRACT

A method involves comparing a determined operating parameter of an engine, with a predefined operating parameter. The method further involves controlling a fuel source and an ignition source of the engine so as to operate at least one engine cylinder in a skip fire mode for at least one cycle of a crank shaft when the determined operating parameter is greater than the predefined operating parameter. The controlling involves transitioning the fuel source from a normal mode to the skip fire mode for the at least one cycle of the crank shaft either before transitioning the ignition source from the normal mode to the skip fire mode or when the ignition source is operated in the normal mode.

18 Claims, 8 Drawing Sheets

(51) Int. Cl.
| | |
|---|---|
| F02D 41/26 | (2006.01) |
| F02D 17/02 | (2006.01) |
| F02D 41/30 | (2006.01) |
| F02M 43/04 | (2006.01) |
| F02M 51/06 | (2006.01) |
| F02P 9/00 | (2006.01) |
| F02P 15/02 | (2006.01) |
| F02D 41/14 | (2006.01) |
| F02D 19/10 | (2006.01) |
| F02P 5/15 | (2006.01) |
| F02M 43/00 | (2006.01) |
| F02B 37/00 | (2006.01) |

(52) U.S. Cl.
CPC ....... *F02D 19/105* (2013.01); *F02D 41/0025* (2013.01); *F02D 41/0087* (2013.01); *F02D 41/1454* (2013.01); *F02D 41/30* (2013.01); *F02D 41/3094* (2013.01); *F02M 43/04* (2013.01); *F02M 51/06* (2013.01); *F02P 9/00* (2013.01); *F02P 15/02* (2013.01); *F02B 37/00* (2013.01); *F02D 41/0027* (2013.01); *F02D 2200/101* (2013.01); *F02D 2200/1002* (2013.01); *F02M 43/00* (2013.01); *F02P 5/1512* (2013.01); *F02P 9/002* (2013.01); *Y02T 10/36* (2013.01)

(58) Field of Classification Search
CPC ............... F02D 41/008; F02D 41/1454; F02D 41/0027; F02D 17/02; F02D 19/0615; F02D 19/061; F02D 19/105; F02D 35/0015; F02P 9/00; F02P 15/02
USPC .............................................. 123/198 F, 481
See application file for complete search history.

(56) References Cited

U.S. PATENT DOCUMENTS

| | | | |
|---|---|---|---|
| 4,231,338 A | 11/1980 | Sugasawa et al. | |
| 4,462,351 A | 7/1984 | Fujii et al. | |
| 4,955,326 A | 9/1990 | Helmich | |
| 5,377,631 A | 1/1995 | Schechter | |
| 5,477,830 A | 12/1995 | Beck et al. | |
| 5,517,976 A | 5/1996 | Baechle et al. | |
| 5,553,575 A | 9/1996 | Beck et al. | |
| 5,561,602 A | 10/1996 | Bessler et al. | |
| 5,826,563 A * | 10/1998 | Patel ................... | F02D 41/0087 |
| | | | 123/198 F |
| 6,006,732 A | 12/1999 | Oleksiewicz | |
| 6,138,650 A | 10/2000 | Bailey | |
| 6,286,489 B1 | 9/2001 | Bailey | |
| 6,360,724 B1 | 3/2002 | Suhre et al. | |
| 6,405,705 B1 | 6/2002 | Dunsworth et al. | |
| 6,408,625 B1 | 6/2002 | Woon et al. | |
| 6,543,230 B1 | 4/2003 | Schmid | |
| 6,789,531 B1 | 9/2004 | Remmels | |
| 6,871,642 B1 | 3/2005 | Osterwald | |
| 6,877,492 B1 | 4/2005 | Osterwald | |
| 6,948,475 B1 | 9/2005 | Wong et al. | |
| 6,953,030 B2 | 10/2005 | Linderyd et al. | |
| 7,270,089 B2 * | 9/2007 | Wong ................... | F02D 19/105 |
| | | | 123/27 GE |
| 7,444,815 B2 | 11/2008 | Baumgard et al. | |
| 7,487,766 B2 | 2/2009 | Alger et al. | |
| 7,640,094 B2 | 12/2009 | Ishikawa et al. | |
| 7,801,664 B2 | 9/2010 | Winstead | |
| 7,849,835 B2 | 12/2010 | Tripathi et al. | |
| 7,941,999 B2 | 5/2011 | Kasper et al. | |
| 8,113,186 B2 | 2/2012 | Tsunooka et al. | |
| 8,205,583 B2 | 6/2012 | Winstead | |
| 8,291,891 B2 | 10/2012 | Alger, II et al. | |
| 8,316,829 B2 | 11/2012 | Piper et al. | |
| 8,566,006 B2 | 10/2013 | Gibble | |
| 8,733,081 B2 | 5/2014 | Miyashita | |
| 8,915,081 B2 | 12/2014 | Hayman et al. | |
| 8,931,462 B2 | 1/2015 | Pappenheimer | |
| 2003/0172900 A1 * | 9/2003 | Boyer ................... | F01L 1/34 |
| | | | 123/198 F |
| 2004/0139944 A1 | 7/2004 | Nakano et al. | |
| 2004/0177605 A1 | 9/2004 | Kojima et al. | |
| 2004/0194463 A1 | 10/2004 | Yanagisawa et al. | |
| 2009/0241918 A1 | 10/2009 | Shinagawa | |
| 2010/0043762 A1 | 2/2010 | Weiss et al. | |
| 2010/0100299 A1 | 4/2010 | Tripathi et al. | |
| 2010/0211294 A1 | 8/2010 | Soejima | |
| 2011/0023829 A1 | 2/2011 | Miyashita | |
| 2011/0030657 A1 | 2/2011 | Tripathi et al. | |
| 2011/0030662 A1 | 2/2011 | Zitzler et al. | |
| 2011/0048372 A1 | 3/2011 | Dibble et al. | |
| 2011/0220068 A1 * | 9/2011 | Ferch .................... | F02D 17/02 |
| | | | 123/481 |
| 2011/0253113 A1 | 10/2011 | Roth et al. | |
| 2011/0265454 A1 | 11/2011 | Smith et al. | |
| 2011/0283682 A1 | 11/2011 | Gallagher et al. | |
| 2011/0307127 A1 | 12/2011 | Swenson et al. | |
| 2012/0042633 A1 * | 2/2012 | Silvestri ............... | F01N 3/208 |
| | | | 60/274 |
| 2012/0046853 A1 | 2/2012 | Silvestri et al. | |
| 2012/0055444 A1 | 3/2012 | Tobergte et al. | |
| 2012/0078492 A1 | 3/2012 | Freund et al. | |
| 2012/0216530 A1 | 8/2012 | Flynn et al. | |
| 2012/0298070 A1 | 11/2012 | Akinyemi et al. | |
| 2012/0323465 A1 | 12/2012 | Peters et al. | |
| 2012/0323470 A1 | 12/2012 | Klingbeil et al. | |
| 2013/0024086 A1 | 1/2013 | Henry et al. | |
| 2013/0144512 A1 * | 6/2013 | Coplin ................. | F02D 19/08 |
| | | | 701/104 |
| 2014/0034014 A1 | 2/2014 | Blythe et al. | |
| 2014/0261309 A1 * | 9/2014 | Chen ................... | F02D 41/0082 |
| | | | 123/320 |
| 2015/0033699 A1 * | 2/2015 | Schaeffer ............. | F02C 7/266 |
| | | | 60/39.827 |
| 2015/0159578 A1 * | 6/2015 | Surnilla ............... | F02D 41/3076 |
| | | | 701/104 |
| 2015/0354482 A1 | 12/2015 | Leone et al. | |

FOREIGN PATENT DOCUMENTS

| | | |
|---|---|---|
| CN | 101994580 A | 3/2011 |
| DE | 19838725 A1 | 3/2000 |
| EP | 1146220 A1 | 10/2001 |
| WO | 2011017272 A1 | 2/2011 |
| WO | 2013029760 A1 | 3/2013 |
| WO | 2013112173 A1 | 8/2013 |

OTHER PUBLICATIONS

R. R. Saraf et al. "Lambda Characterization of Diesel-CNG Dual Fuel Engine", Environmental and Computer Science, 2009. ICECS '09. Second International Conference on, IEEE Xplore, Dec. 28-30, 2009, pp. 170-174.
Faiz et al., "Air Pollution from Motor Vehicles:Standards and Technologies for Controlling Emissions", World Bank Technical Paper No. 308, pp. 1-266, 1996.
Wallace et al., "Initial Development of an Experimental Automotive Uniflow 2-Stroke Diesel Engine", Energy Conversion Engineering Conference, Proceedings of the 31st Intersociety, vol. No. 2, pp. 730-735, Aug. 11-16, 1996.
PCT Search Report and Written Opinion issued in connection with related PCT Application No. PCT/US2012/038496 on Oct. 8, 2012.
US Non-Final Office Action issued in connection with related U.S. Appl. No. 13/113,138 on Dec. 9, 2013.
PCT Search Report and Written Opinion issued in connection with related PCT Application No. PCT/US2013/047503 on Dec. 10, 2013.
US Non-Final Office Action issued in connection with related U.S. Appl. No. 13/562,356 on Jun. 30, 2014.
US Final Office Action issued in connection with related U.S. Appl. No. 13/113,138 on Jul. 2, 2014.

(56) References Cited

OTHER PUBLICATIONS

US Notice of Allowance Office Action issued in connection with related U.S. Appl. No. 13/562,356 on Nov. 20, 2014.
US Non-Final Office Action issued in connection with related U.S. Appl. No. 13/113,138 on Dec. 9, 2014.
US Final Office Action issued in connection with related U.S. Appl. No. 13/113,138 on Jun. 29, 2015.
US Notice of Allowance Office Action issued in connection with related U.S. Appl. No. 13/113,138 on Sep. 17, 2015.
US Notice of Allowance Office Action issued in connection with related U.S. Appl. No. 13/113,138 on Dec. 30, 2015.
US Notice of Allowance Office Action issued in connection with related U.S. Appl. No. 14/632,028 on May 11, 2016.
Unofficial English Translation of Chinese Office Action issued in connection with related CN Application No. 201380040841.9 on Sep. 5, 2016.
U.S. Appl. No. 13/113,138, filed May 23, 2011, Omowoleola Chukuwuemeka Akinyemi et al.
U.S. Appl. No. 13/562,356, filed Jul. 31, 2012, Neil Xavier Blythe et al.
U.S. Appl. No. 15/132,013, filed Apr. 18, 2016, Omowoleola Chukuwuemeka Akinyemi et al.

\* cited by examiner

SYSTEM AND METHOD FOR CONTROLLING OPERATION OF AN ENGINE

BACKGROUND

The invention relates generally to engines, and more particularly, to a system and method for controlling operation of an engine, for example, a dual fuel engine.

In a compression-ignition engine, such as a diesel engine, a fuel injection system injects fuel (e.g. diesel fuel) into compressed air within each of the engine cylinders to create an air-fuel mixture that ignites due to the heat and pressure of compression. Unfortunately, engine efficiency, power output, fuel consumption, exhaust emissions, and other operational characteristics are less than ideal. In addition, conventional techniques to improve one operational characteristic often worsen one or more other operational characteristic. For example, attempts to decrease specific fuel consumption often cause increase in various exhaust emissions. Vehicle exhaust emissions include pollutants such as carbon monoxide, nitrogen oxides ($NO_x$), particulate matter (PM), and unburned hydrocarbons (UHC) generated due to incomplete combustion of fuel within the combustion chamber. The amount of these pollutants varies depending on the fuel-air mixture, compression ratio, injection timing, ambient conditions, and so forth.

In the oil and gas market and transportation sector, for example, the fuel bill is one of the contributors to the total cost of operation. The rapid expansion and abundance of natural gas in some areas of the world is driving a dramatic cost advantage of natural gas over diesel fuel, making natural gas a very economical fuel source. A dual fuel engine is based on a traditional diesel engine, with the addition of dual fuel specific hardware. When the engine is operating in dual fuel mode, natural gas is introduced into an intake system. Near the end of the compression stroke, diesel fuel is then injected. The diesel fuel ignites and the diesel combustion causes the natural gas to burn.

At lower power conditions, for example, at less than 25% of a full load, an air-fuel ratio is high due to lower fueling relative to air flow and lower pressure. Such a high air-fuel ratio results in incomplete combustion, particularly of the premixed natural gas, resulting in unburned fuel, leading to reduced efficiency and higher hydrocarbon emissions.

There is need for an enhanced system for controlling operation of an engine.

BRIEF DESCRIPTION

In accordance with one exemplary embodiment, a method is disclosed. The method involves comparing a determined operating parameter of an engine, with a predefined operating parameter. The method further involves controlling a fuel source and an ignition source of the engine so as to operate at least one engine cylinder in a skip fire mode for at least one cycle of a crank shaft when the determined operating parameter is greater than the predefined operating parameter. The controlling involves transitioning the fuel source from a normal mode to the skip fire mode for the at least one cycle of the crank shaft either before transitioning the ignition source from the normal mode to the skip fire mode or when the ignition source is operated in the normal mode.

In accordance with another exemplary embodiment, a computer readable medium, having instructions stored thereon which, when executed, causes a controller for an engine to perform a method is disclosed. The method involves comparing a determined operating parameter of an engine, with a predefined operating parameter. The method further involves controlling a fuel source and an ignition source of the engine so as to operate at least one engine cylinder in a skip fire mode for at least one cycle of a crank shaft when the determined operating parameter is greater than the predefined operating parameter. The controlling involves transitioning the fuel source from a normal mode to the skip fire mode for the at least one cycle of the crank shaft either before transitioning the ignition source from the normal mode to the skip fire mode or when the ignition source is operated in the normal mode.

In accordance with yet another exemplary embodiment, a system is disclosed. The system includes an engine having a plurality of cylinders and a fuel injector coupled to the plurality of cylinders. A controller is coupled to the fuel injector. The controller is configured to compare a determined operating parameter of an engine, with a predefined operating parameter. The controller is further configured to control a fuel source and an ignition source of the engine so as to operate at least one engine cylinder in a skip fire mode for at least one cycle of a crank shaft when the determined operating parameter is greater than the predefined operating parameter. The control involves transitioning the fuel source from a normal mode to the skip fire mode for the at least one cycle of the crank shaft either before transitioning the ignition source from the normal mode to the skip fire mode or when the ignition source is operated in the normal mode.

DRAWINGS

These and other features, aspects, and advantages of the present invention will become better understood when the following detailed description is read with reference to the accompanying drawings in which like characters represent like parts throughout the drawings, wherein.

DETAILED DESCRIPTION

The singular forms "a", "an", and "the" include plural references unless the context clearly dictates otherwise.

As used herein, the term "non-transitory computer-readable media" is intended to be representative of any tangible computer-based device implemented in any method or technology for short-term and long-term storage of information, such as computer-readable instructions, data structures, program modules and sub-modules, or other data in any device. Therefore, the methods described herein may be encoded as executable instructions embodied in a tangible, non-transitory, computer readable medium, including, without limitation, a storage device and/or a memory device. Such instructions, when executed by a processor, cause the processor to perform at least a portion of the methods described herein. Moreover, as used herein, the term "non-transitory computer-readable media" includes all tangible, computer-readable media, including, without limitation, non-transitory computer storage devices, including, without limitation, volatile and nonvolatile media, and removable and non-removable media such as a firmware, physical and virtual storage, CD-ROMs, DVDs, and any other digital source such as a network or the internet, as well as yet to be developed digital means, with the sole exception being a transitory, propagating signal.

As used herein, the terms "software" and "firmware" are interchangeable, and may include any computer program stored in memory for execution by devices that include, without limitation, mobile devices, clusters, personal computers, workstations, clients, and servers.

As used herein, the term "computer" and related terms, e.g., "computing device", are not limited to integrated circuits referred to in the art as a computer, but broadly refers to at least one microcontroller, microcomputer, programmable logic controller (PLC), application specific integrated circuit, and other programmable circuits, and these terms are used interchangeably herein.

In accordance with certain embodiments of the present invention, a method for operating an engine is disclosed. The method involves comparing a determined operating parameter with a predefined operating parameter. The method further involves controlling a fuel source and an ignition source so as to operate at least one engine cylinder in a skip fire mode for at least one cycle of a crank shaft when the determined operating parameter is greater than the predefined operating parameter. In accordance with certain other embodiments a system for controlling operation of an engine is disclosed. The system includes a controller coupled to a fuel injector of an engine. The controller is configured to compare a determined operating parameter with a predefined operating parameter. The controller is further configured to control a fuel source and an ignition source so as to operate at least one engine cylinder in a skip fire mode for at least one cycle of a crank shaft when the determined operating parameter is greater than the predefined operating parameter. The control involves transitioning the fuel source from a normal mode to the skip fire mode for the at least one cycle of the crank shaft either before transitioning the ignition source from the normal mode to the skip fire mode or when the ignition source is operated in the normal mode. In accordance with another embodiment, a computer readable medium, having instructions stored thereon which, when executed, causes a controller for an engine to perform an exemplary method, is disclosed. In accordance with yet another embodiment, a system having an engine and a controller is disclosed. At least one cylinder of the engine is operated in a skip fire mode so that more power is is extracted from the remaining cylinders of the engine and exhaust emissions are reduced.

Figure 1:
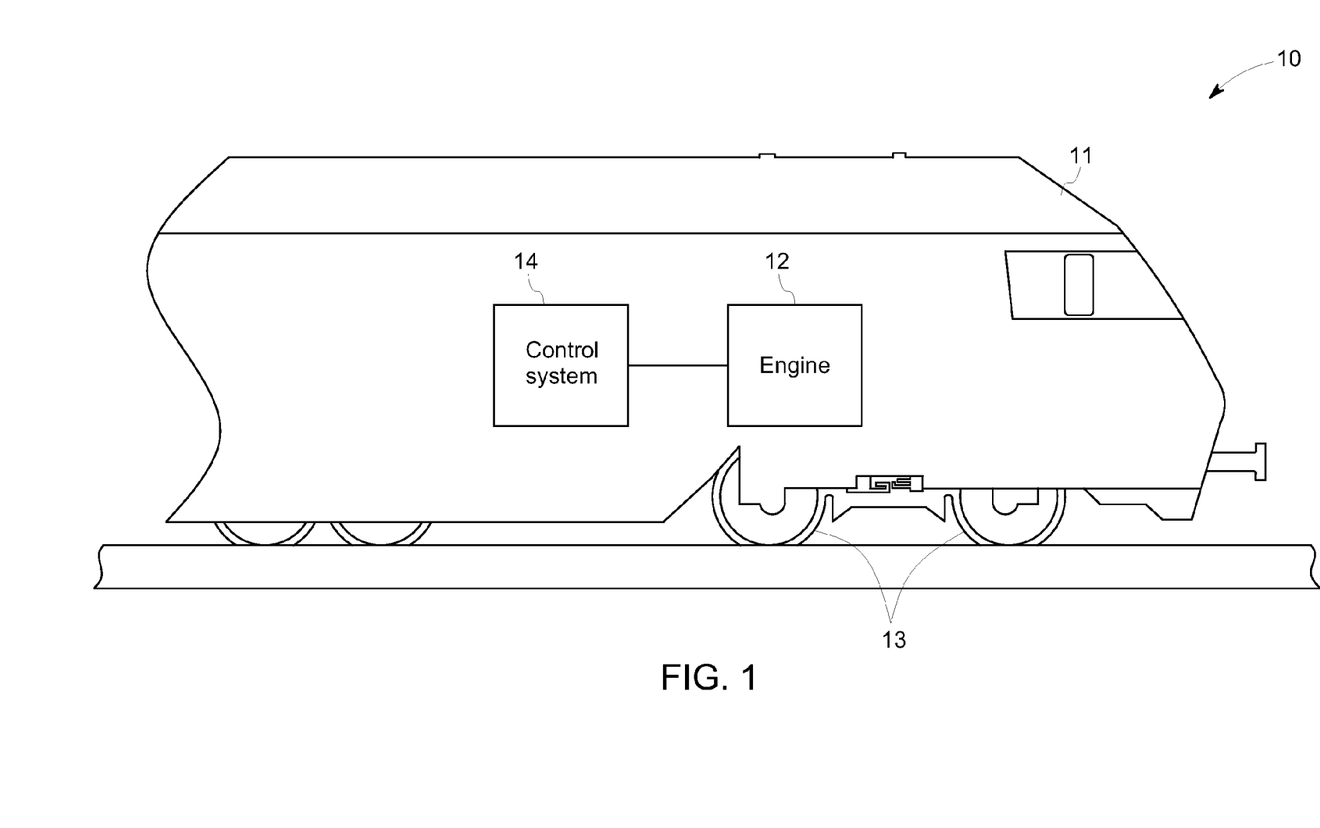
FIG. 1 is a schematic diagrammatical representation of a vehicle moving from a first operating point to a second operating point along a predefined path in accordance with an exemplary embodiment.

Referring to FIG. 1, a schematic diagrammatical representation of a vehicle 10 moving from a first operating point to a second operating point along a predefined path is shown. In the illustrated embodiment, the vehicle 10 is a locomotive. Suitable vehicles include passenger and non-passenger vehicles, hybrid vehicles, off-highway vehicles, on-road vehicles (such as tractor trailers), tracked vehicles, rail vehicles, and the like. The vehicle 10 includes an engine 12 and an exemplary control system 14 coupled to the engine 12. The engine 12 and the control system 14 are mounted to a frame 11 provided with a plurality of wheels 13.

In the illustrated embodiment, the vehicle 10 is driven by the engine 12 utilizing a plurality of fuels. In the exemplary engine 12, a reduction in nitrogen oxide ($NO_x$) and particulate matter (PM) emissions is enabled by combusting a relatively larger fraction of the premixed fuel. However, relative costs and availability of different fuels are constantly in flux. For example, in some embodiments, diesel and natural gas may be utilized to drive the engine 12. If the cost of diesel increases relative to the cost of the natural gas, more natural gas may be used resulting in reduced cost and emissions. If the cost of natural gas is increased relative to the cost of the diesel, then more diesel may be used to drive the engine 12. It should be noted herein that in certain embodiments, the vehicle 10 may also utilize other fuels instead of diesel and natural gas.

The exemplary control system 14 is used to control operation of the engine 12 and reduce exhaust emissions from the engine 12. Although a dual fuel engine is discussed herein, the exemplary control system and an associated method may also be applicable to other types of engine, for example, a spark ignited single fuel engine. In one embodiment, the engine may be a two stroke engine and in another embodiment, the engine may be a four stroke engine. In certain other embodiments, the engine 12 and the control system 14 may be used for stationary applications. The engine 12 and the control system 14 are explained in greater detail with reference to subsequent figures.

As mentioned previously, at least one cylinder of the engine 12 is operated in a skip fire mode so that more power is extracted from the remaining cylinders of the engine and exhaust emissions are reduced. Such an increased fueling reduces an air-to-fuel ratio for those cylinders that are fueled and allows the engine 12 to combust the fuel more efficiently. Hence, the resulting unburned hydrocarbons are significantly reduced.

Figure 2:
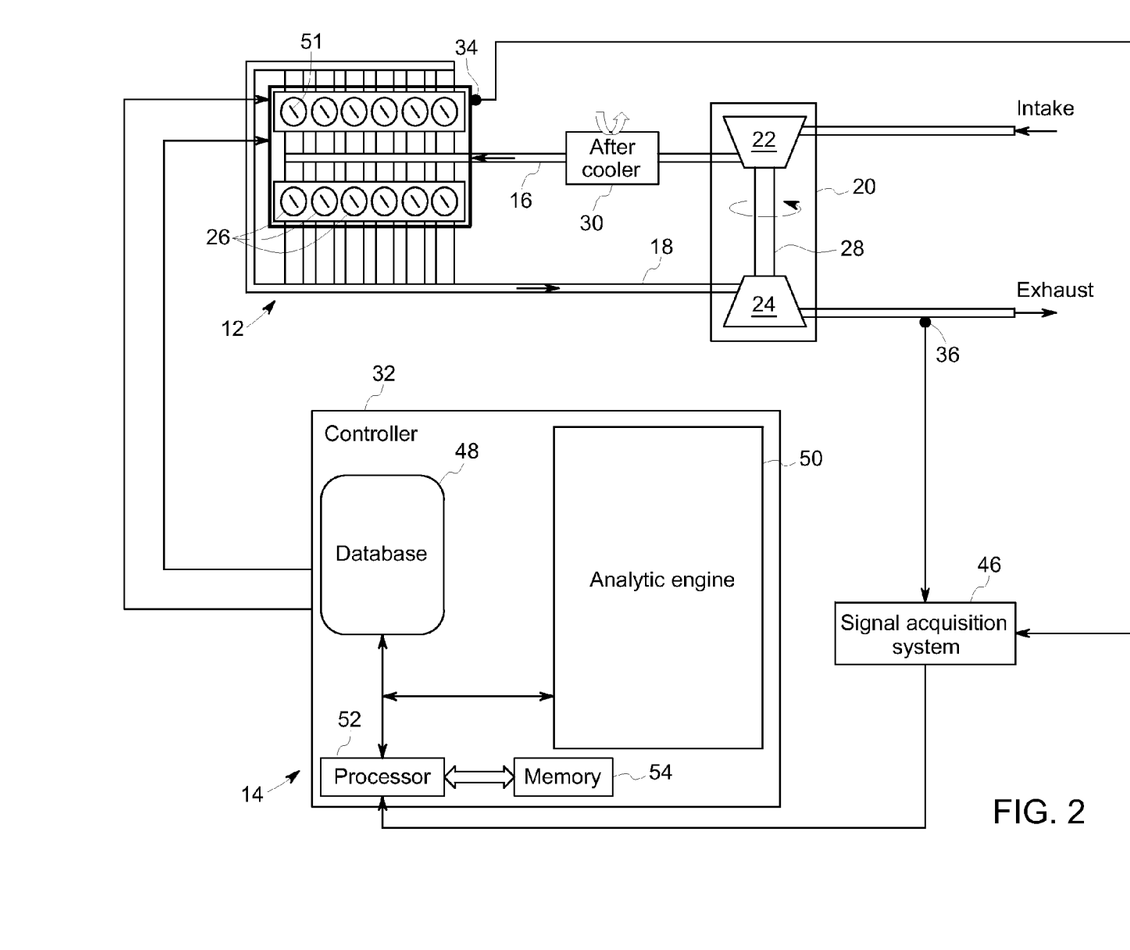
FIG. 2 is a schematic diagrammatical representation of a dual fuel engine having emission control features in accordance with certain embodiments of the present invention.

Referring to FIG. 2, a schematic diagrammatical representation of the engine 12 having emission control features is illustrated in accordance with certain embodiments of the present invention. As discussed in further detail below, embodiments of the present invention provide monitoring and control features, such as sensors and control logic in which at least one engine cylinder is operated in a skip fire mode and the remaining engine cylinders are fueled more, leading to a more efficient operation of the engine 12. Such an increased fueling of the remaining cylinders reduces an air-fuel ratio and allows the engine 12 to combust the fuel more efficiently. Hence generation of unburned hydrocarbons is significantly reduced.

In the illustrated embodiment, the engine 12 is a dual fuel engine. The illustrated engine 12 includes an air intake manifold 16 and an exhaust manifold 18. The engine 12 is provided with a turbocharger 20 having a compressor 22 and a turbine 24. The compressor 22 is operated to supply compressed air to the intake manifold 16 for combustion within a plurality of cylinders 26. The turbine 24 is coupled to the exhaust manifold 18, such that the exhaust gases expand through the turbine 24, putting work onto and rotating a turbocharger shaft 28 coupled to the compressor 22. The compressor 22 draws ambient air through a filter (not shown) and provides compressed air to a heat exchanger 30. The temperature of air is increased due to compression through the compressor 20. The compressed air flows through the heat exchanger 30 such that the temperature of air is reduced prior to delivery into the intake manifold 16 of the engine 12. In one embodiment, the heat exchanger 30 is an air-to-water heat exchanger, which utilizes a coolant to facilitate removal of heat from the compressed air. In another embodiment, the heat exchanger 30 is an air-to-air heat exchanger, which utilizes ambient air to facilitate removal of heat from the compressed air. In another embodiment, the heat exchanger 30 is a combination of an air-to-air heat exchanger and an air-to-water heat exchanger, which utilizes both ambient air and liquid to facilitate removal of heat from the compressed air.

The control system 14 also includes a controller 32. In one embodiment, the controller 32 is an electronic logic controller that is programmable by a user. In the illustrated embodiment, an operating parameter sensor 34 and an exhaust sensor 36 are used to measure an operating parameter and exhaust emissions respectively of the engine 12. The controller 14 receives the corresponding output signals from the sensors 34, 36. In other embodiments, other types of sensors for measuring different operating parameters associated with the engine 12 may be used. In one specific embodiment, the operating parameter may be air-fuel ratio which is compared with a predefined air-fuel ratio. In other specific embodiments, the controller 14 may estimate the air-fuel ratio based on the measured different parameters associated with the engine 12. In other words, instead of the sensor 34, the air-fuel ratio may be determined based on information related to pressure, temperature, turbo speed, or the like of the engine 12. In certain other embodiments, the operating parameter may be at least one of engine power and engine speed which is compared with at least one of predefined power and predefined speed.

A signal acquisition system 46 receives the plurality of signals from the plurality of sensors 34, 36 and transmits the plurality of signals to the controller 32. In other words, the controller 32 receives the determined operating parameter from the sensor 34 and the quantity of exhaust emissions from the sensor 36 via the signal acquisition system 46. The controller 32 includes a database 48, an analytic engine 50, a processor 52, and a memory 54.

The database 48 may be configured to store predefined information about the engine 12. For example, the database 48 may store information relating to air-fuel ratio, exhaust emissions, type of fuel, type of engine, engine speed, engine power, crank shaft rotation, or the like. Furthermore, the database 48 may be configured to store actual sensed/detected information from the above-mentioned sensors 34, 36. The algorithm facilitates the processing of signals from the above-mentioned plurality of sensors 34, 36.

In one embodiment, the database 48 may be stored in a single memory module at one location. In other embodiments, the database 48 may be stored in a plurality of memory modules in a distributed manner. The database 48 may be at least one of a SQL database, an Oracle database, and a MySQL database. In alternate embodiments, other types of databases including relationship database systems (RDBS) may be used to store the plurality of rules. It may be noted herein that in one embodiment, the database 48 is a customized database. In other embodiments, the database 48 may be an off-the-shelf database.

The analytic engine 50 is communicatively coupled to the database 48. The analytic engine 50 may be stored in the memory 54 and executable by the processor 52. In an alternate embodiment, the analytic engine 50 may also be a specialized hardware such as a Field Programmable Gate Array (FPGA). The analytic engine 50 includes codes and routines configured to control the fuel injectors 38, 40, so as to operate at least one engine cylinder 26 in a skip fire mode for at least one cycle of a crank shaft 51 when the determined operating parameter is greater than a predefined operating parameter.

In one embodiment, the analytic engine 50 includes a set of instructions executable by the processor 52. In another embodiment, the analytic engine 50 is stored in the memory 54 and is accessible and executable by the processor 52. In either embodiment, the analytic engine 50 is adapted for communication and co-operation with the processor 52 and other modules of the controller 32.

The processor 52 is communicatively coupled to the database 48 and the analytic engine 50. The processor 52 may include at least one arithmetic logic unit, microprocessor, general purpose controller or other processor arrays to perform the desired computations. In one embodiment, the processor 52 is a custom hardware configured to perform functions of the analytic engine 50 and the signal acquisition system 46. In another embodiment, the processor 52 is a digital signal processor or a microcontroller. The processor 52 may also be configured to manage the contents of the database 48. In some embodiments, other type of processors, operating systems, and physical configurations are envisioned.

The memory 54 is coupled to the processor 52 and may also be optionally coupled to the other modules of the controller 32. The memory 54 is configured to store instructions performed by the processor 52 and contents of the database 48. The memory 54 may be a non-transitory storage medium. For example, the memory 54 may be a dynamic random access memory (DRAM) device, a static random access memory (SRAM) device, flash memory, or other memory devices. In one embodiment, the memory 54 may include a non-volatile memory or similar permanent storage device, and media such as a hard disk drive, a floppy disk drive, a compact disc read only memory (CD-ROM) device, a digital versatile disc read only memory (DVD-ROM) device, a digital versatile disc random access memory (DVD-RAM) device, a digital versatile disc rewritable (DVD-RW) device, a flash memory device, or other non-volatile storage devices. In one embodiment, the memory 54 may be communicatively coupled to the processor 52. In an alternate embodiment, the memory 54 is an on-board memory of the processor 52.

In an exemplary embodiment, the non-transitory computer readable medium encoded with a program, instructs the processor 52 to perform functions associated with the controller 32 for controlling operation of the engine 12. The program instructions include one or more functions of the database 48, the analytic engine 50, and the signal acquisition system 46.

Figure 3:
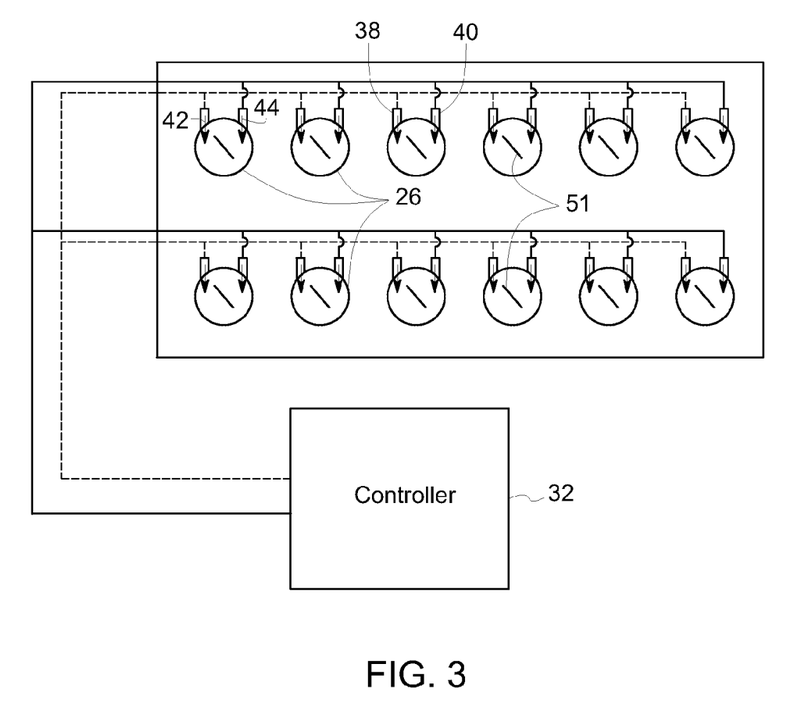
FIG. 3 is a schematic diagrammatical representation of a controller and a plurality of engine cylinders of a dual fuel engine in accordance with certain embodiments of the present invention.

Referring to FIG. 3, a detailed schematic representation of the controller 32 and the plurality of cylinders 26 is shown. A plurality of first and second fuel injectors 38, 40 are used for injecting a plurality of fuels (for example, a first fuel 42 and a second fuel 44 respectively) into the plurality of cylinders 26 of the engine 12. The first fuel 42 may be a liquid fuel and the second fuel 44 may be a gaseous fuel. In one embodiment, the gaseous fuel may be natural gas and the liquid fuel may be diesel. Specifically, the first fuel injectors 38 is used to inject the first fuel 42 into the plurality of cylinders 26 of the engine 12. The second fuel injectors 40 inject the second fuel 44 into the intake manifold 16 of the engine 12. In the illustrated embodiment, the plurality of first fuel injectors 38 constitutes an ignition source and the plurality of second fuel injectors 40 constitutes a fuel source. Additionally, control valves (not shown) may be provided to control injection of the plurality of fuels 42, 44 into the plurality of cylinders 26. It should be noted herein that the terms "first fuel", "liquid fuel", and "diesel" may be used interchangeably. Similarly, the terms "second fuel", "gaseous fuel", and "natural gas" may be used interchangeably. A piston (not shown) is slidably disposed in each cylinder 26 and reciprocates between a top dead center and a bottom dead center position. The controller 32 is operable to produce a control signal to control the plurality of first and second fuel injectors 38, 40, receive corresponding output signals from the sensors 34, 36, and control operation of the engine 12.

In one embodiment, the controller 32 controls the plurality of first fuel injectors 38 for injecting the first fuel 42 and one fuel injector from the plurality of second fuel injectors 40 for skipping injection of the second fuel 44 for the at least one cycle of the crank shaft 51 when the determined operating parameter is greater than the predefined operating parameter. One or more cylinders from the plurality of the cylinders 26 may be operated in a skip fire mode. In one specific embodiment, one cylinder 26 may be operated in-turn in a skip fire mode for each cycle of the crank shaft 51. For example, if there are six cylinders, cylinder 1 may be operated in a skip fire mode for one cycle of the crank shaft 51. Thereafter, cylinder 2 may be operated in a skip fire mode for another cycle of the crank shaft 51. Similarly the skip fire mode may be repeated for each cylinder. The order of the cylinders and cycles of the crank shaft 51 for operating in a skip fire mode may vary depending on the application. Various patterns of skip fire mode are envisioned in order to maintain all the cylinders 26 warm and also to maintain good mechanical balance of the engine 12.

In another instance, the controller 32 controls one fuel injector from the plurality of first fuel injectors 38 for skipping injection of the first fuel 42 and one fuel injector from the plurality of second fuel injectors 40 for skipping injection of the second fuel 44 for another cycle after the at least one cycle of the crank shaft 51, when the determined operating parameter is greater than the predefined operating parameter. In yet another instance, the controller 32 controls one fuel injector from the plurality of first fuel injectors 38 for skipping injection of the first fuel 42 and one fuel injector from the plurality of second fuel injectors 40 for skipping injection of the second fuel 44 for subsequent alternate cycles after the at least one cycle of the crank shaft 51, when the determined operating parameter is greater than the predefined operating parameter.

In another embodiment, the controller 32 controls the plurality of first fuel injectors 38 for injecting the first fuel 42 and the plurality of second fuel injectors 40 for skipping injection of the second fuel 44 for alternate cycles of the crank shaft 51, when the determined operating parameter is greater than the predefined operating parameter.

Figure 4:
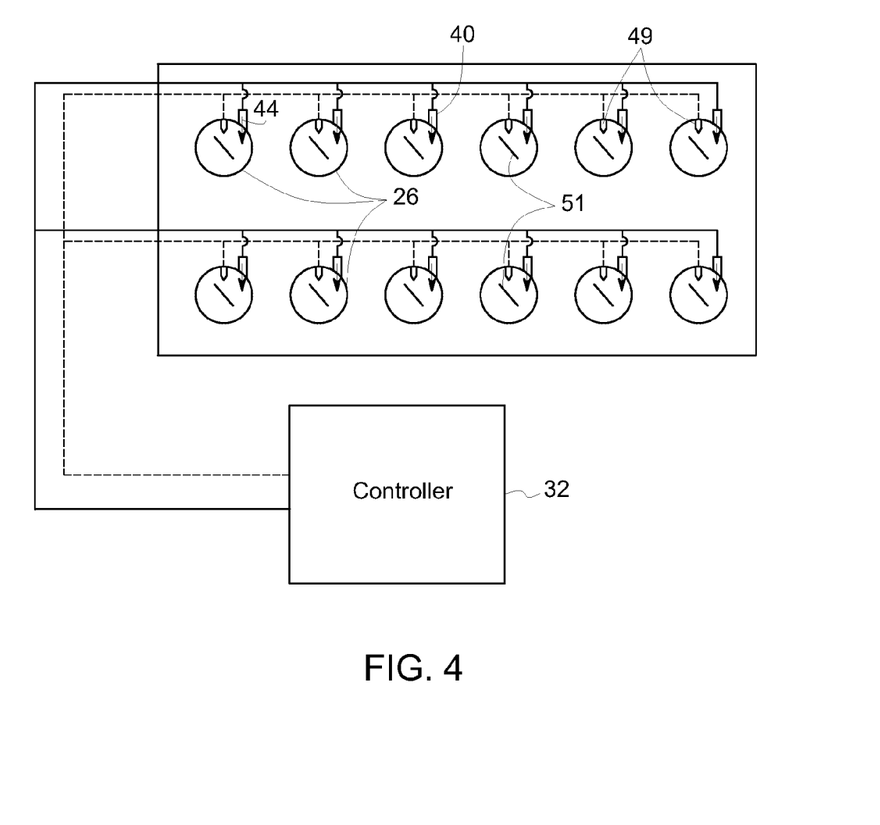
FIG. 4 is a schematic diagrammatical representation of a controller and a plurality of engine cylinders of a single fuel spark ignited engine in accordance with certain embodiments of the present invention.

FIG. 4 is a detailed schematic representation of the controller 32 and the plurality of cylinders 26. In the illustrated embodiment, the engine 12 does not have the fuel injectors 38 (shown in FIG. 3) but has only the fuel injectors 40 for injecting the fuel 44, for example gaseous fuel. The engine 12 has a plurality of spark plugs 49 for igniting a spark for combustion of the fuel 44. In the illustrated embodiment, the plurality of fuel injectors 40 constitutes a fuel source and the plurality of spark plugs 49 constitutes an ignition source.

In one embodiment, the controller 32 controls the spark plugs 49 for triggering a spark and one fuel injector from the plurality of fuel injectors 40 for skipping injection of the fuel 44 for the at least one cycle of the crank shaft 51 when the determined operating parameter is greater than the predefined operating parameter.

In another instance, the controller 32 controls one spark plug from the plurality of spark plugs 49 for skipping trigger of the spark and one fuel injector from the plurality of fuel injectors 40 for skipping injection of the fuel 44 for another cycle after the at least one cycle of the crank shaft 51, when the determined operating parameter is greater than the predefined operating parameter. In yet another instance, the controller 32 controls one spark plug from the plurality of spark plugs 49 for skipping trigger of the spark and one fuel injector from the plurality of fuel injectors 40 for skipping injection of the fuel 44 for subsequent alternate cycles after the at least one cycle of the crank shaft 51, when the determined operating parameter is greater than the predefined operating parameter.

In another embodiment, the controller 32 controls the spark plugs 49 for triggering the spark and one fuel injector from the plurality of fuel injectors 40 for skipping injection of the fuel 44 for alternate cycles of the crank shaft 51, when the determined operating parameter is greater than the predefined operating parameter.

Figure 5:
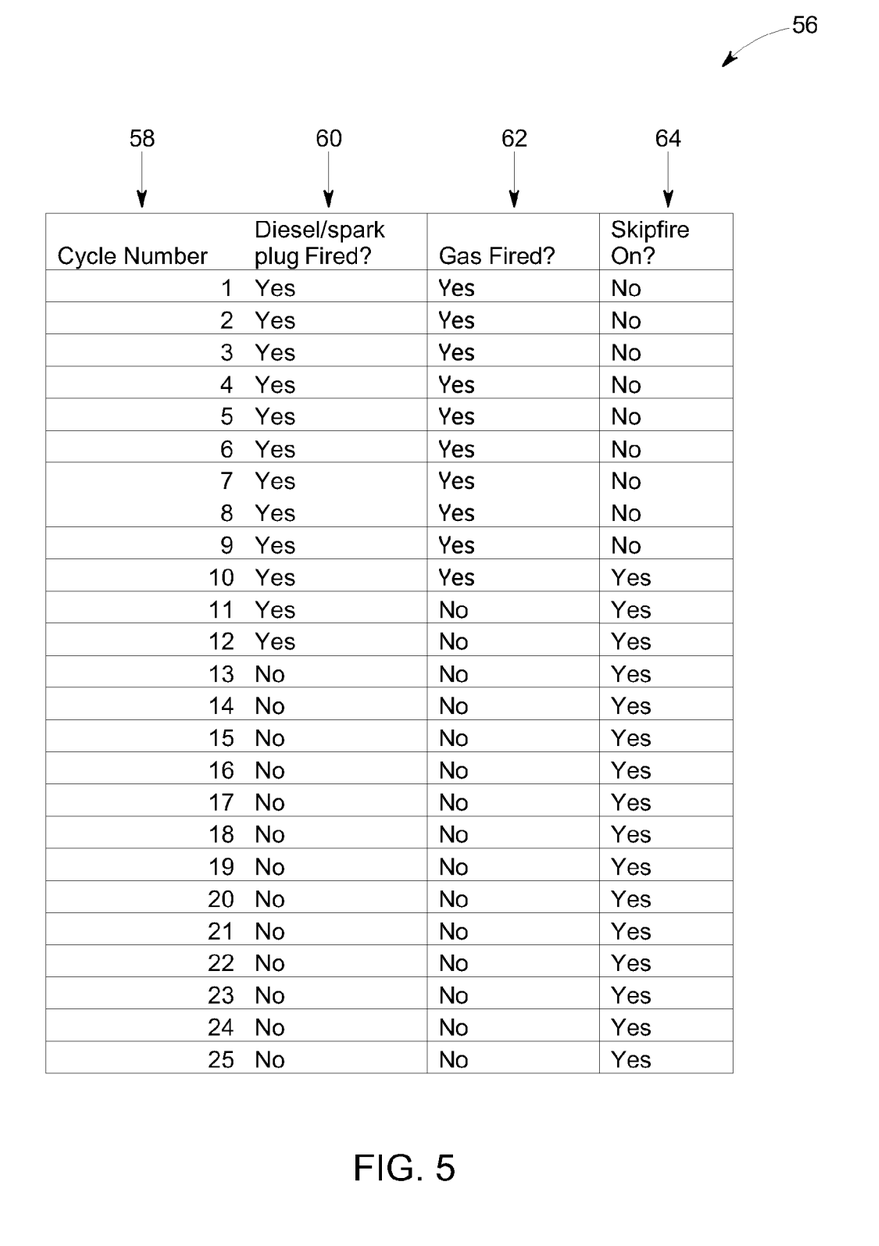
FIG. 5 is a table representative of a skip fire mode of an engine in accordance with an exemplary embodiment.

FIG. 5 shows a table 56 representative of a skip fire mode of an engine in accordance with an exemplary embodiment. The table 56 has a column 58 indicative of a number of consecutive cycles of a crank shaft, a column 60 representative of a status as to whether diesel is fired into a plurality of cylinders, a column 62 representative of a status as to whether a gaseous fuel is fired into the plurality of cylinders, a column 64 representative of a status as to whether a skip fire mode is activated. For each cycle, status of firing of fuel/activation of skip fire mode is indicated by either a "Yes" or "No". In the illustrated embodiment, the column 58 shows 25 cycles of the crank shaft.

In accordance with the illustrated embodiment, for cycles 1-9 of the crank shaft, the engine is not operated in a skip fire mode. For cycle 10 of the crank shaft, column 64 is indicative of the activation of skip fire mode. However, diesel and the gaseous fuel are fired into the plurality of cylinders. It should be noted herein that in accordance with the embodiments discussed herein, once the skip fire mode is activated, there may be a small delay in real time for at least one more cycle of the crank shaft until the skip fire is initiated. Such a delay in initiation of the skip fire is done to ensure there is always a pilot injection of the diesel to ignite the gaseous fuel during a transition from a normal mode to skip fire mode. For example, when there is a requirement for a transition from a normal mode to a skip fire mode and if the gaseous fuel is injected before a command for the transition was triggered and diesel injection is skipped after the command for the transition was triggered, the gaseous fuel does not burn, resulting in wastage of fuel and generation of higher hydrocarbon emissions. In accordance with the embodiments of the present invention, the delay in initiation of the skip fire for at least one more cycle of the crank shaft is done to overcome the associated problems during the transition from the normal mode to the skip fire mode.

For cycles 11, 12 of the crank shaft, column 64 is indicative of the activation of the skip fire mode. Specifically, for cycles 11 and 12, diesel is fired into the plurality of cylinders and the gaseous fuel is not fired (skip fire) to one cylinder. For cycles 13-25 of the crank shaft, column 64 is indicative of activation of the skip fire mode. Specifically, for cycles 13-25, both diesel and the gaseous fuel are not fired to one cylinder.

In another embodiment, for a single fuel spark ignited engine, the column 60 is representative of a status as to whether spark is triggered. For cycle 10 of the crank shaft, column 64 is indicative of the activation of skip fire mode. However, spark is triggered and the gaseous fuel is fired into the plurality of cylinders. For cycles 11, 12 of the crank shaft, column 64 is indicative of the activation of the skip fire mode. Specifically, for cycles 11 and 12, the spark is triggered to the plurality of cylinders and the gaseous fuel is not fired (skip fire) to one cylinder. For cycles 13-25 of the crank shaft, column 64 is indicative of activation of the skip fire mode. Specifically, for cycles 13-25, the spark is not triggered and the gaseous fuel is not fired, to one cylinder.

Figure 6:
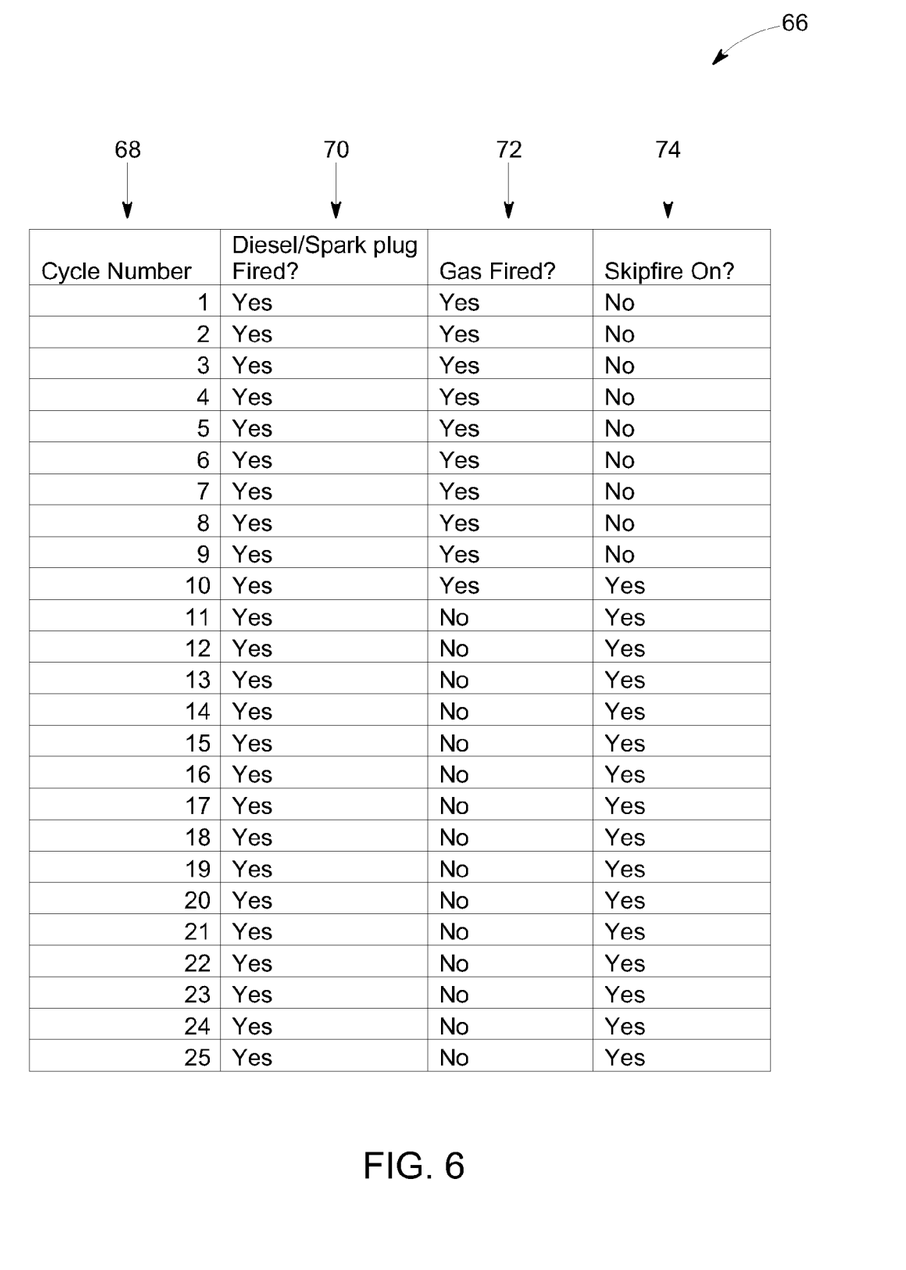
FIG. 6 is a table representative of a skip fire mode of an engine in accordance with another exemplary embodiment.

FIG. 6 shows a table 66 representative of a skip fire mode of a dual fuel engine in accordance with another exemplary embodiment. The table 66 has a column 68 indicative of a number of consecutive cycles of a crank shaft, a column 70 representative of a status as to whether diesel is fired into a plurality of cylinders, a column 72 representative of a status as to whether a gaseous fuel is fired into the plurality of cylinders, a column 74 representative of a status as to whether a skip fire mode is activated. For each cycle, status of firing of fuel/activation of skip fire mode is indicated by either a "Yes" or "No". In the illustrated embodiment, the column 74 shows 25 cycles of the crank shaft.

In accordance with the illustrated embodiment, for cycles 1-9 of the crank shaft, the engine is not operated in a skip fire mode. For cycle 10 of the crank shaft, column 74 is indicative of the activation of the skip fire mode. However, diesel and the gaseous fuel are fired into the plurality of cylinders. For cycles 11-25 of the crank shaft, column 74 is indicative of the activation of the skip fire mode. Specifically, for cycles 11-25, diesel is fired into the plurality of cylinders and the gaseous fuel is not fired (skip fire) to one cylinder.

In another embodiment, for a single fuel spark ignited engine, the column 70 is representative of a status as to whether spark is triggered. For cycle 10 of the crank shaft, column 74 is indicative of the activation of the skip fire mode. However, spark is triggered and the gaseous fuel is fired into the plurality of cylinders. For cycles 11-25 of the crank shaft, column 74 is indicative of the activation of the skip fire mode. Specifically, for cycles 11-25, the spark is triggered to the plurality of cylinders and the gaseous fuel is not fired (skip fire) to one cylinder.

Figure 7:
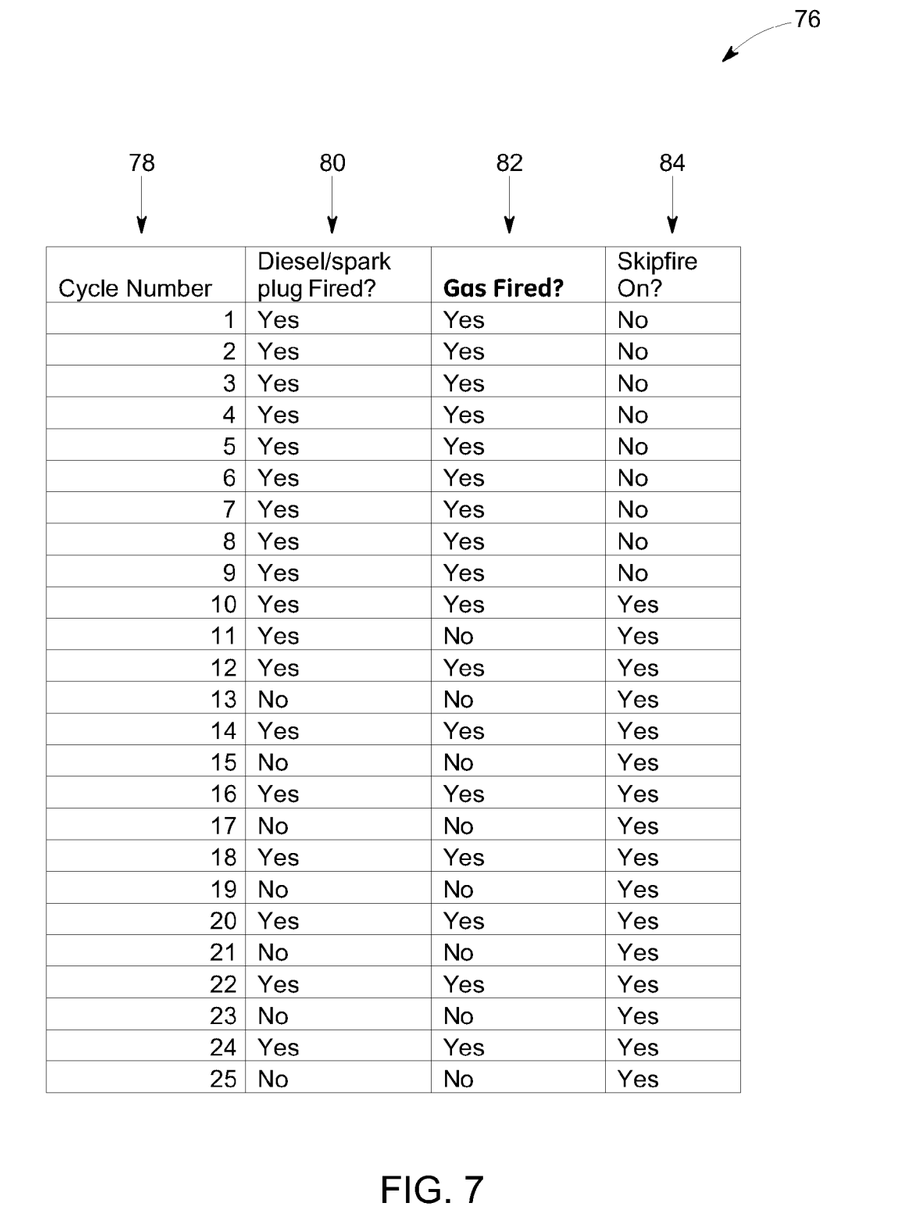
FIG. 7 is a table representative of a skip fire mode of an engine in accordance with yet another exemplary embodiment.

FIG. 7 shows a table 76 representative of a skip fire mode of a dual fuel engine in accordance with another exemplary embodiment. The table 76 has a column 78 indicative of a number of consecutive cycles of a crank shaft, a column 80 representative of a status as to whether diesel is fired into a plurality of cylinders, a column 82 representative of a status as to whether a gaseous fuel is fired into the plurality of cylinders, a column 84 representative of a status as to whether a skip fire mode is activated. For each cycle, status of firing of fuel/activation of skip fire mode is indicated by either a "Yes" or "No". In the illustrated embodiment, the column 84 shows 25 cycles of the crank shaft.

In accordance with the illustrated embodiment, for cycles 1-9 of the crank shaft, the engine is not operated in a skip fire mode. For cycles 10, 12, 14, 16, 18, 20, 22, and 24 of the crank shaft, column 84 is indicative of the activation of the skip fire mode. However, for the cycles 10, 12, 14, 16, 18, 20, 22, and 24, both diesel and the gaseous fuel are fired into the plurality of cylinders. Further, for cycles 11, 13, 15, 17, 19, 21, 23, and 25 (alternate cycles) of the crank shaft, column 84 is indicative of the activation skip fire mode. Specifically, for cycle 11, diesel is fired into the plurality of cylinders and the gaseous fuel is not fired (skip fire) to one cylinder. Specifically, for cycles 13, 15, 17, 19, 21, 23, and 25, both diesel and the gaseous fuel are not fired into one cylinder.

In another embodiment, for a single fuel spark ignited engine, the column 80 is representative of a status as to whether spark is triggered. For cycles 10, 12, 14, 16, 18, 20, 22, and 24 of the crank shaft, column 84 is indicative of the activation of the skip fire mode. However, for the cycles 10, 12, 14, 16, 18, 20, 22, and 24, spark is triggered and the gaseous fuel is fired into the plurality of cylinders. Further, for cycles 11, 13, 15, 17, 19, 21, 23, and 25 (alternate cycles) of the crank shaft, column 84 is indicative of the activation skip fire mode. Specifically, for cycle 11, spark is triggered to the plurality of cylinders and the gaseous fuel is not fired (skip fire) to one cylinder. Specifically, for cycles 13, 15, 17, 19, 21, 23, and 25, spark is not triggered and the gaseous fuel is not fired, into one cylinder.

Figure 8:
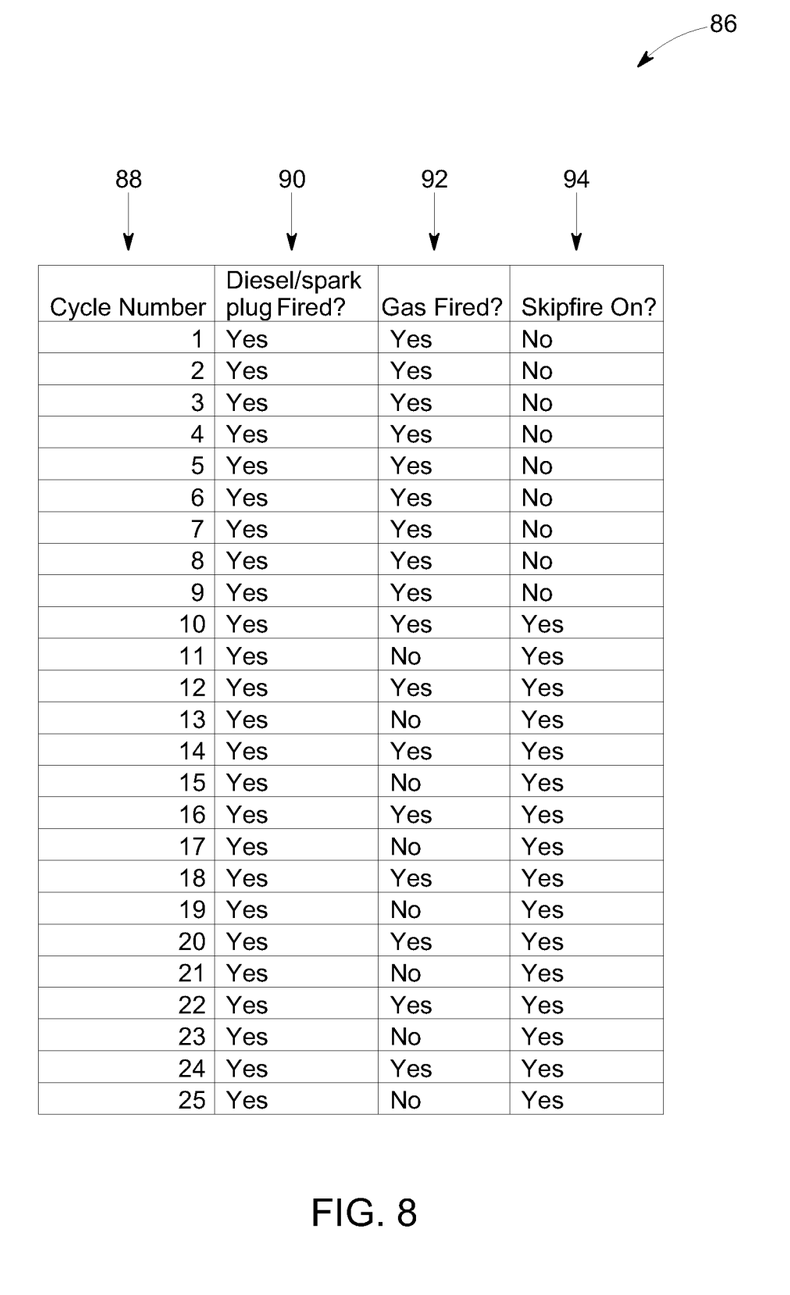
FIG. 8 is a table representative of a skip fire mode of an engine in accordance with yet another exemplary embodiment.

FIG. 8 shows a table 86 representative of a skip fire mode of a dual fuel engine in accordance with another exemplary embodiment. The table 86 has a column 88 indicative of a number of consecutive cycles of a crank shaft, a column 90 representative of a status as to whether diesel is fired into a plurality of cylinders, a column 92 representative of a status as to whether a gaseous fuel is fired into the plurality of cylinders, a column 94 representative of a status as to whether a skip fire mode is activated. For each cycle, status of firing of fuel/activation of skip fire mode is indicated by either a "Yes" or "No". In the illustrated embodiment, the column 94 shows 25 cycles of the crank shaft.

In accordance with the illustrated embodiment, for cycles 1-9 of the crank shaft, the engine is not operated in a skip fire mode. For cycles 10, 12, 14, 16, 18, 20, 22, and 24 of the crank shaft, column 94 is indicative of the activation of the skip fire mode. However, for the cycles 10, 12, 14, 16, 18, 20, 22, and 24, both diesel and the gaseous fuel are fired into the plurality of cylinders. Further, for cycles 11, 13, 15, 17, 19, 21, 23, and 25 (alternate cycles) of the crank shaft, column 94 is indicative of the activation skip fire mode. Specifically, for cycles 11, 13, 15, 17, 19, 21, 23, and 25, diesel is fired into the plurality of cylinders and the gaseous fuel is not fired (skip fire) to one cylinder. It should be noted herein various other patterns of the skip fire mode are also envisioned. All such permutations and combinations are envisioned within the scope of the invention.

In another embodiment, for a single fuel spark ignited engine, the column 90 is representative of a status as to whether spark is triggered. For cycles 10, 12, 14, 16, 18, 20, 22, and 24 of the crank shaft, column 94 is indicative of the activation of the skip fire mode. However, for the cycles 10, 12, 14, 16, 18, 20, 22, and 24, spark is triggered and the gaseous fuel is fired into the plurality of cylinders. Further, for cycles 11, 13, 15, 17, 19, 21, 23, and 25 (alternate cycles) of the crank shaft, column 94 is indicative of the activation skip fire mode. Specifically, for cycles 11, 13, 15, 17, 19, 21, 23, and 25, spark is triggered to the plurality of cylinders and the gaseous fuel is not fired (skip fire) to one cylinder.

In accordance with the embodiments discussed herein, operating an engine in a skip fire mode, allows the engine to run at a lower power in a dual fuel mode. Hence, the amount of diesel needed for operation and emissions are reduced, and fuel efficiency is enhanced. The transition to and from skip fire operation is controlled so that misfire events are prevented.

While only certain features of the invention have been illustrated and described herein, many modifications and changes will occur to those skilled in the art. It is, therefore, to be understood that the appended claims are intended to cover all such modifications and changes as fall within the true spirit of the invention.

The invention claimed is:

1. A method comprising:
comparing a determined operating parameter of an engine, with a predefined operating parameter; and
controlling a fuel source and an ignition source of the engine so as to operate at least one engine cylinder in a skip fire mode for at least one cycle of a crank shaft when the determined operating parameter is greater than the predefined operating parameter; wherein the controlling comprises:
transitioning the fuel source from a normal mode to the skip fire mode for the at least one cycle of the crank shaft either before transitioning the ignition source from the normal mode to the skip fire mode or when the ignition source is operated in the normal mode, wherein the fuel source comprises a plurality of first fuel injectors, the ignition source comprises a plurality of second fuel injectors, and the engine is a dual fuel engine.

2. The method of claim 1, further comprising receiving the determined operating parameter from a sensor.

3. The method of claim 1, wherein the determined operating parameter comprises a determined air-fuel ratio and the predefined operating parameter comprises a predefined air-fuel ratio.

4. The method of claim 1, wherein the determined operating parameter comprises at least one of a determined engine speed and determined engine power and the predefined operating parameter comprises at least one of a predefined engine speed and predefined engine power.

5. The method of claim 1, wherein the controlling further comprises controlling the plurality of first fuel injectors for injecting a first fuel and one fuel injector from the plurality of second fuel injectors for skipping injection of a second fuel for the at least one cycle of the crank shaft when the determined operating parameter is greater than the predefined operating parameter.

6. The method of claim 5, wherein the controlling further comprises controlling one fuel injector from the plurality of first fuel injectors for skipping injection of the first fuel and the one fuel injector from the plurality of second fuel injectors for skipping injection of the second fuel for another cycle after the at least one cycle of the crank shaft when the determined operating parameter is greater than the predefined operating parameter.

7. The method of claim 5, wherein the controlling further comprises controlling one fuel injector from the plurality of first fuel injectors for skipping injection of the first fuel and the one fuel injector from the plurality of second fuel injectors for skipping injection of the second fuel for subsequent alternate cycles after the at least one cycle of the crank shaft when the determined operating parameter is greater than the predefined operating parameter.

8. The method of claim 5, wherein the controlling further comprises controlling the plurality of first fuel injectors for injecting the first fuel and the one fuel injector from the plurality of second fuel injectors for skipping injection of the second fuel for alternate cycles of the crank shaft when the determined operating parameter is greater than the predefined operating parameter.

9. The method of claim 1, wherein the controlling further comprises controlling the plurality of first fuel injectors for injecting a first fuel and the plurality of second fuel injectors for injecting a second fuel during a transition from the normal mode to the skip fire mode.

10. A computer readable medium, having instructions stored thereon which, when executed, causes a controller for an engine to perform a method, the method comprising:
comparing a determined operating parameter of the engine with a predefined operating parameter; and
controlling a fuel source and an ignition source so as to operate at least one engine cylinder in a skip fire mode for at least one cycle of a crank shaft when the determined operating parameter is greater than the predefined operating parameter, wherein the controlling comprises:
transitioning the fuel source from a normal mode to the skip fire mode for the at least one cycle of the crank shaft either before transitioning the ignition source from the normal mode to the skip fire mode or when the ignition source is operated in the normal mode, wherein the fuel source comprises a plurality of first fuel injectors, the ignition source comprises a plurality of second fuel injectors; and the engine is a dual fuel engine.

11. The computer readable medium of claim 10, wherein the method further comprises receiving the determined operating parameter from a sensor.

12. The computer readable medium of claim 10, wherein the determined operating parameter comprises a determined air-fuel ratio and the predefined operating parameter comprises a predefined air-fuel ratio.

13. The computer readable medium of claim 10, wherein the determined operating parameter comprises at least one of a determined engine speed and determined engine power and the predefined operating parameter comprises at least one of a predefined speed and predefined power.

14. The computer readable medium of claim 10, wherein the controlling further comprises controlling the plurality of first fuel injectors for injecting a first fuel and one fuel injector from the plurality of second fuel injectors for skipping injection of a second fuel for the at least one cycle of the crank shaft when the determined operating parameter is greater than the predefined operating parameter.

15. The computer readable medium of claim 14, wherein the controlling further comprises controlling one fuel injector from the plurality of first fuel injectors for skipping injection of the first fuel and the one injector from the plurality of second fuel injectors for skipping injection of the second fuel for another cycle after the at least one cycle of the crank shaft when the determined operating parameter is greater than the predefined operating parameter.

16. The computer readable medium of claim 14, wherein the controlling further comprises controlling one fuel injector from the plurality of first fuel injectors for skipping injection of the first fuel and the one fuel injector from the plurality of second fuel injectors for skipping injection of the second fuel for subsequent alternate cycles after the at least one cycle of the crank shaft when the determined operating parameter is greater than the predefined operating parameter.

17. The computer readable medium of claim 14, wherein the controlling further comprises controlling the plurality of first fuel injectors for injecting the first fuel and the one fuel injector from the plurality of second fuel injectors for skipping injection of the second fuel for alternate cycles of the crank shaft when the determined operating parameter is greater than the predefined operating parameter.

18. The computer readable medium of claim 10, wherein the controlling further comprises controlling the plurality of first fuel injectors for injecting a first fuel and the plurality of second fuel injectors for injecting a second fuel during a transition from the normal mode to the skip fire mode.

\* \* \* \* \*